March 19, 1957  J. A. TALALAY  2,786,038
METHOD FOR THE MANUFACTURE OF CELLULAR
RUBBER OF THE LATEX FOAM TYPE
Filed Dec. 31, 1949  4 Sheets-Sheet 3

INVENTOR.
JOSEPH ANTON TALALAY
BY
ATT'Y.

March 19, 1957　　　　　J. A. TALALAY　　　　　2,786,038
METHOD FOR THE MANUFACTURE OF CELLULAR
RUBBER OF THE LATEX FOAM TYPE
Filed Dec. 31, 1949　　　　　　　　　　4 Sheets-Sheet 4

INVENTOR.
JOSEPH ANTON TALALAY
BY
ATT'Y.

United States Patent Office 2,786,038
Patented Mar. 19, 1957

2,786,038

METHOD FOR THE MANUFACTURE OF CELLULAR RUBBER OF THE LATEX FOAM TYPE

Joseph Anton Talalay, New Haven, Conn., assignor, by direct and mesne assignments, of one-half to The Dayton Rubber Company, Dayton, Ohio, a corporation of Ohio, and one-half to The B. F. Goodrich Company, Akron, Ohio, a corporation of New York Application December 31, 1949, Serial No. 136,195

13 Claims. (Cl. 260—2.5)

This invention relates to a process for the foaming of aqueous dispersions of rubber and for the manufacture of cellular rubber of the latex foam type.

The product which is now commonly known as foam rubber is formed by converting latex into a foam and thereafter coagulating and vulcanizing the foam in a mold to its final shape.

In accordance with one method now in common use, the latex composition is whipped or beaten into a foam very much in the manner of beating egg whites or whipping cream. A chemical coagulant is introduced into the latex either after or during the whipping operation in order that coagulation of the latex to rubber may occur at a later stage of the process. This coagulant is of the delayed action type and its action is not completed until after the foam has been introduced into the mold. While in the mold, the coagulation is completed and vulcanization is effected by heating the product either in the mold or after removal from the mold in a vulcanizing chamber.

A more recent process for the manufacture of latex foam rubber is disclosed and claimed in United States patent to Talalay No. 2,432,353. In this process latex foam is formed either before introduction into the mold or after the composition has been placed in the mold and the foam is then frozen as rapidly as possible to a solid state but at a temperature which will not effect irreversible coagulation. It was discovered that the rapid drop in temperature of the foam is accompanied by a rapid increase in viscosity. In this way drainage of the foam and collapse of the cell walls together with coalescence of bubbles and foam were minimized or avoided. As a result, a much more uniform and stronger foam rubber could be prepared than by using chemical coagulants. It was further discovered that the frozen uncoagulated foam possessed a stereoreticulate structure which would permit the circulation of fluid gaseous or liquid coagulants through the solid mass. In this way coagulation of the solidified foam could be effected after formation and at its optimum condition of porosity. After coagulation, the frozen coagulated product is then thawed and vulcanized by introducing the mold into a vulcanizing chamber in the conventional manner.

In the operation of the Talalay process it was found preferable to cause the major portion of the foaming within the mold itself. Methods which would permit this to be carried out are described in the patents to Talalay No. 2,140,062 and Wolf No. 2,138,081. In accordance with the latter patent for example, the foaming of latex is effected by the incorporation of a peroxide followed by the decomposition of the peroxide to liberate free oxygen. In order to permit evolution of oxygen at a satisfactory rate and to enable the decomposition to go to completion, it is desirable to utilize a catalyst for the decomposition of hydrogen peroxide. The process may then be carried out by incorporating the peroxide with its catalyst into the latex composition and then promptly introducing the mixture into the mold and closing the mold. The decomposition of peroxide and evolution of gas with resultant foaming is then carried out primarily within the mold. By coordinating the amount of peroxide with the amount of latex it is possible to control the density and porosity of the foam and at the same time obtain a product with little or no collapse of the cell wall.

In the manufacture of foam type rubber by the use of the peroxide-foaming process referred to, it is essential that any substantial decomposition of peroxide and liberation of oxygen be delayed or retarded until after the mold has been closed. It is also desirable to avoid too rapid evolution of oxygen and resultant foaming even after the mold has been closed, in order to permit uniform foam formation throughout the mold cavity and to avoid excessive escape of foam through the vent openings provided in the mold accompanied by resultant clogging of the vents and the formation of gas pockets in the product. The catalyst is also necessary to insure complete decomposition of the oxygen compound. By delaying the decomposition of peroxide and minimizing foaming until after introduction of the latex mixture into the mold, proper filling of the mold under pressure of the evolved gas is insured. At the same time the pores of the product will be expanded to their maximum number and dimensions and shrinkage or contraction of the product which may occur during later stages of manufacture will be minimized. A further reason for delay in the rate of decomposition is the fact that too rapid an initial rate of decomposition will cause a rapid initial rise in the temperature of the mixture due to the exothermic heat of decomposition of the oxygen compound, with resultant acceleration in the rate of decomposition and generation of the foam. This may result in non-uniform expansion within the mold. While the process may be carried out without the use of catalysts, or by using catalysts, such as hemoglobin, as described by the Wolf patent, or catalase as described by the Talalay patent, it has been found that the objectives referred to above can best be achieved by the use of these and other catalysts under certain carefully controlled conditions in accordance with the present invention.

It is therefore an object of the present invention to provide a process for the foaming of acqueous rubber dispersions by the decomposition of unstable oxygen compounds wherein catalysts are utilized for the decomposition reaction under conditions such that they will display a delayed or retarded initial catalytic activity.

It is a further object of the present invention to provide a method for the manufacture of cellular rubber of the foam latex type in which the foam is generated by the expansion produced by the decomposition of an unstable oxygen compound and wherein the rate of the reaction is controlled by means of a catalyst having a delayed initial activity.

It is an additional object of the present invention to describe a method for the foaming of aqueous rubber dispersions and the manufacture of foam rubber therefrom by the catalytic decomposition of unstable oxygen compounds, such as hydrogen peroxide, through the use of catalysts for the decomposition under conditions enabling them to exhibit a delayed catalytic action.

In accordance with the present invention, it has been found that the foaming of aqueous rubber dispersions may be carried out by the incorporation of unstable oxygen compounds of the type described in the aforesaid Wolf and Talalay patents, such as hydrogen peroxide, sodium peroxide, sodium perborate, and other per-compounds capable of liberating oxygen by spontaneous or catalytic decomposition at or near room temperatures, and by the use of catalytic materials exhibiting a delayed action under the influence of conditions such as hereinafter set forth.

The most satisfactory catalysts for the decomposition of hydrogen peroxide and other unstable oxygen compounds of the type referred to herein are those consisting of or containing catalase, such as aqueous solutions of catalase itself, yeast or hemoglobin. In accordance with this invention, a delayed initial catalytic activity may be imparted to these catalysts by the following methods:

1. By refrigeration of the latex mixture or dispersion to which the catalyst is added, preferably at temperatures in the range of about 30° F. to 60° F.
2. By the use of yeast as a catalyst, especially under certain conditions such as:
    a. Preparation of the yeast by dispersing it in water at a predetermined temperature, preferably at about 80° F.
    b. Pretreatment of yeast dispersed in water by means of air, oxygen, or $CO_2$ in order to cause absorption of oxygen or $CO_2$ by the yeast.
    c. Incorporation of a modifying agent, such as saponin.
3. By the temporary chemical poisoning or inhibition of the catalytic activity. For example, by the use of minor portions of formaldehyde, sulfanilamide, sodium pentachlorophenol, or toluene.
4. By the adsorption of the catalyst on a carrier or support.
5. By the addition of the alkaline materials to the aqueous rubber dispersions, such as potassium hydroxide or sodium hydroxide.

The following description and the accompanying drawings will describe in greater detail the procedures referred to above.

Figure 1:
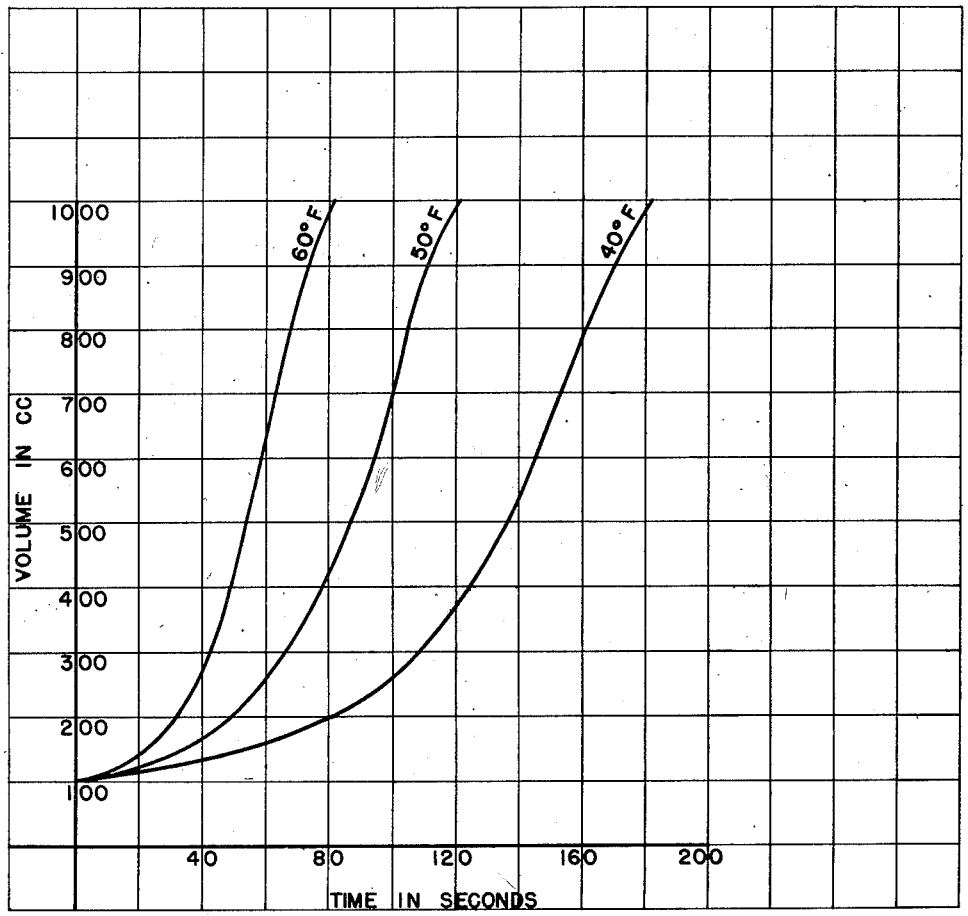
Figures 1 and 2 are graphs illustrating the effect of temperature of the latex composition on the rate of expansion or generation of foam.

Although it had been found that catalase in its pure form, preferably in dilute aqueous solution, would function satisfactorily as a catalyst for the decomposition of hydrogen peroxide for many uses, it was also discovered that such decomposition (to be complete) proceeds at too rapid a rate and exhibits no delayed action in the initial stages making it less desirable as a catalyst for the expansion of latex to foam rubber. In contradistinction it has been found, in accordance with this invention, that yeast, such as brewers' or bakers' yeast, is a satisfactory material for use as a catalyst in the making of foam rubber since its catalase concentration and stability are adequate for the intended purpose. A further advantage of yeast was the discovery that when treated in certain ways it inherently possessed a certain amount of delayed action as a catalyst, or in other words, had an induction period.

In order to permit proper control of catalytic activity during the initial stages of the decomposition of peroxide, as pointed out above, it became necessary to develop certain modes of retarding, inhibiting, or delaying this activity during the initial stages of the reaction. The manner in which this is accomplished is described in detail as follows:

In accordance with this invention it was discovered that by refrigerating the latex compound to a temperature in the range of about 30° F. to 60° F., preferably in the range of about 40° F. to 50° F., prior to the incorporation of the peroxide and the catalyst, such as yeast, the induction period before evolution of oxygen progressed to a rapid rate, was substantially increased. Furthermore, the exothermic heat of decomposition was absorbed by the cold latex without materially affecting the ultimate rate of reaction. A typical procedure for carrying out this process may be described as follows:

A natural or synthetic rubber latex preferably concentrated to a solids content of 60% or more is stored in a refrigerated chamber at a temperature of between 30° F. and 60° F. This latex has previously been compounded with fillers, pigments, stabilizers, vulcanizing agents, and accelerators such as are known to the art. A measured quantity of hydrogen peroxide solution is then stirred into a predetermined amount of the cold latex which has been removed from the storage tank. A suitable amount of catalyst, such as catalase or yeast dispersion, is then mixed into the latex composition. Immediately after stirring in the catalyst the latex mixture is introduced into a mold of suitable volume and the mold is then closed. The decomposition of the peroxide and liberation of oxygen accompanied by foaming of the latex then continues in the mold until the mold is full. Vent holes are provided in the mold in order to permit the escape of the air being displaced as the latex expands. The selective escape of air without permitting the excape of latex can be accomplished in accordance with U. S. patent to Talalay No. 2,265,823, by the use of a porous gasket. The mold is then immersed in a refrigerant bath maintained at a suitably low temperature. The mold is kept immersed in the freezing bath until solidification and freezing of the foam has taken place. At this time the mold is removed from the freezing bath and a gaseous or liquid coagulant is introduced into the mold and into the frozen mass. Preferably, the mold has been provided with inlet nipples so that lines connected to a source of coagulant, such as gaseous carbon dioxide, may be connected thereto. Coagulant is introduced at a low super atmospheric pressure and permeates the frozen mass thereby effecting coagulation prior to any thawing thereof. When coagulation is completed, which requires only a few minutes, the mold is then introduced into a vulcanizing chamber and vulcanization is effected while the mold remains in a closed position. After vulcanization the mold is opened and the product is stripped therefrom, washed, and dried.

In the manufacture of certain types of products, it may be desirable to use fixed or stationary molds in a press type of operation. In such methods, molds are provided with heat exchange tubes or the like, built into the top and bottom portions of the mold in order that the refrigeration and vulcanization may be carried out in indirect heat exchange with the foam in the mold. This is usually accomplished by circulating refrigerant and/or vulcanization fluids, such as steam, through the tubes while the mold is maintained in a fixed position in the press.

The foregoing procedure describes the process which is disclosed in the patent to Talalay No. 2,432,353 in which coagulation is effected by means of a fluid coagulant after freezing of the foam. In place of this method of coagulation, gelling of the foam may be effected by incorporating a delayed action coagulant, such as sodium silicofluoride, into the latex mixture along with the peroxide and catalyst in the manner generally described in the patent to Wolf No. 2,138,081.

The yeast utilized is preferably of the conventional brewers' or bakers' type and may be either wet pressed cake or dry. A dispersion is prepared for use by breaking the yeast up in small pieces and putting it into a mixer with water, for example about one and one-half times its weight. After mixing for approximately a half an hour the yeast becomes thoroughly dispersed in the water. The dispersion is then removed from the mixture and another one and one-half times the weight of water based on the yeast is added with stirring making a 25% yeast dispersion. In order to obtain a fairly uniform dispersion the mixture may be ball milled for an hour or more if desired. The dispersion may then be stored under refrigeration until used. Generally it is desirable to dilute this dispersion further prior to incorporation into the latex.

The proportions of yeast, peroxide, and latex used will depend upon the type of product desired, its density, the volume of the mold, and other conditions. In general, the amount of peroxide or other unstable oxygen compound used is based primarily on the volume of the mold. It is generally desirable to use enough of the oxygen compound to generate about 5% to 10% more oxygen at atmospheric pressure than is represented by the volume of the mold. This permits a small excess pressure in the mold. The ratio of catalyst to peroxide is generally such that a relatively complete decomposition of the peroxide is insured at a suitable rate of expansion of the foam. In the case of yeast, a desirable ratio is in the neighborhood of 3 cc. of a 10% solution of yeast to 7 cc. of 130 vol. $H_2O_2$ for each 100 grams of latex compound, or about 0.075 to 0.3 gram of yeast for each gram of $H_2O_2$.

The volume of the fully expanded foam is generally at least ten times that of the initial liquid latex composition. In actual practice it has been found that it requires at least about thirty seconds in which to mix the peroxide and yeast into a batch of latex and then introduce this batch into the mold cavity and close the mold. In this period of time it has been found undesirable to permit more than about 300% expansion of the latex. The time interval in which the latex will expand 300% of its original volume may be considered as representing a suitable induction period for the decomposition reaction. The length of time in which complete expansion of the foam should occur may be varied. In general, however, too rapid expansion is undesirable since gas pockets may result, the foam may be forced through vent openings in the mold, and uneven distribution of the foam may occur. On the other hand, too slow a rate of expansion is also undesirable since the length of the operating cycle is thereby unduly increased and the structure of the foam itself may be affected. It is usually preferable to carry out complete expansion of the foam in about one and one-half to six minutes.

Figure 2:
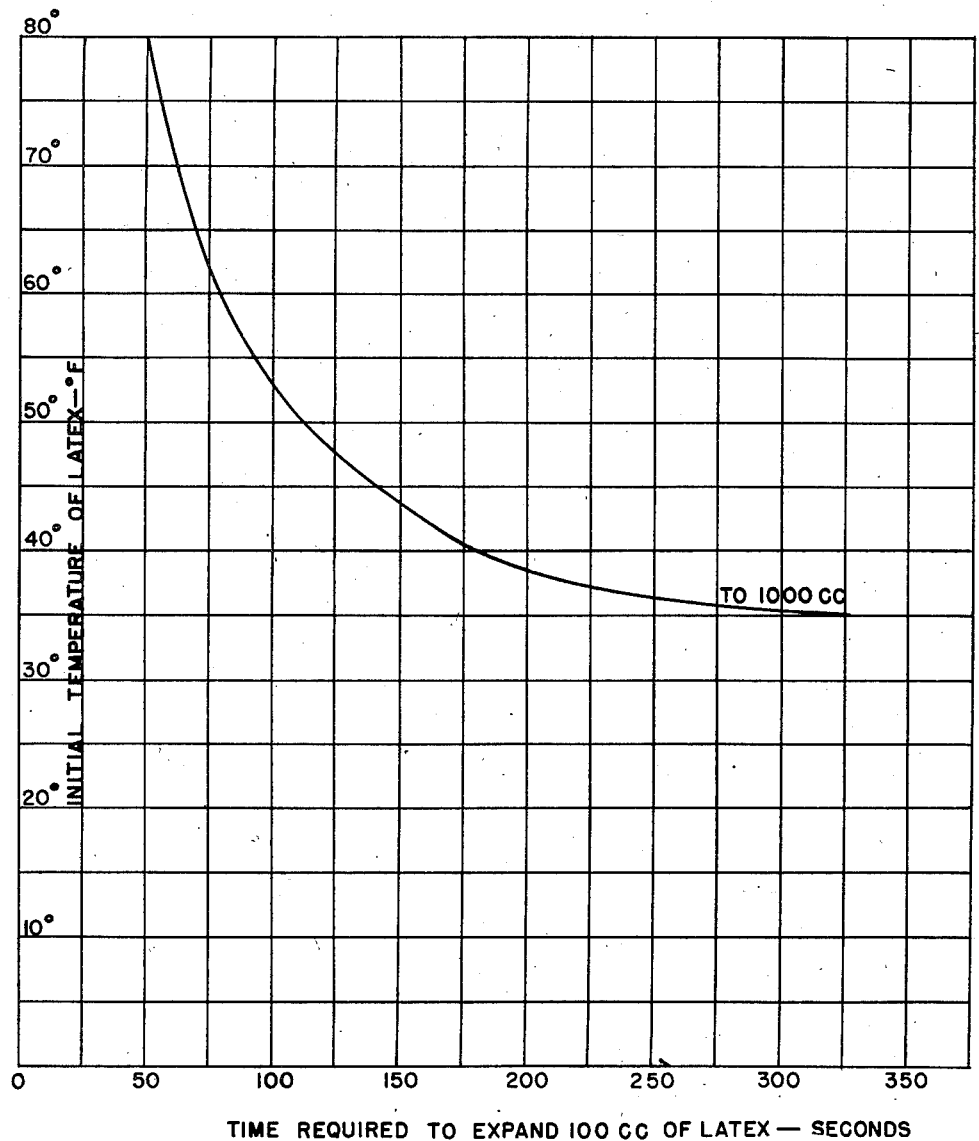

The results obtained by means of refrigeration of the latex are illustrated in the graphs of Figures 1 and 2. In Figure 1 the time required to foam 100 cc. of latex compound to 1000 cc. is plotted for initial latex temperatures of 40°, 50°, and 60° F. respectively. In Figure 2 the time required to expand 100 cc. of the latex compound to 1000 cc. is plotted against initial temperature of the latex compound. The results clearly indicated that above about 60° F. the rate of expansion is too rapid for most purposes while below about 40° F. the rate of expansion is somewhat too slow. Temperatures of about 40° F. to 50° F. are preferred while temperatures of about 60° F. down to the freezing point of the latex, or about 30° F., may be used.

Figure 3:
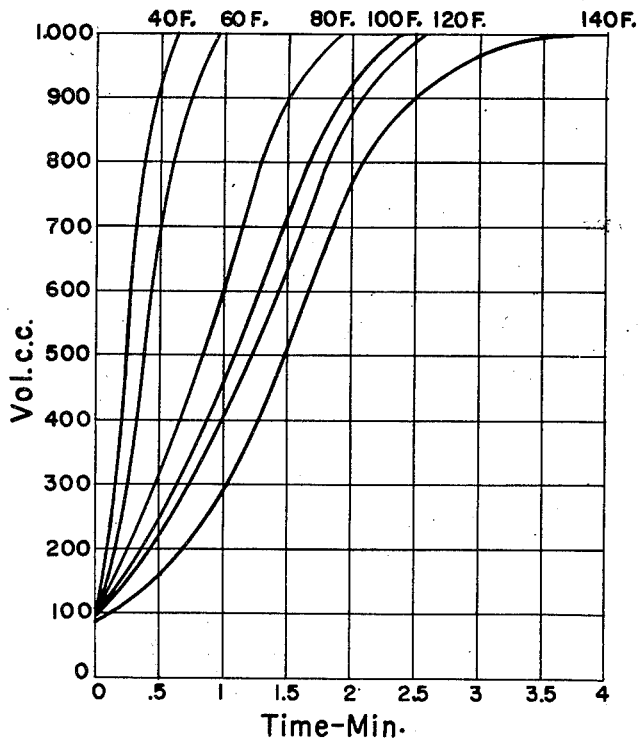
Figure 3 is a graph illustrating the effect of temperature at which yeast dispersions are prepared upon the rate of foam development.

While the activity of the catalyst may be modified by refrigeration as described above, it has also been found in the case of yeast in particular that the catalytic activity may be modified in other ways. For example, as illustrated in the graph of Figure 3, it was found that the initial catalytic activity of the yeast may be modified by preparing the dispersion at the different temperatures. In accordance with this modification the yeast dispersion was prepared at different temperatures and afterwards cooled to room temperature. The results indicated that the temperature at which the yeast was dispersed had a decided influence on its catalytic activity, and that the higher the temperature of the preparation of the yeast dispersion the slower was its catalytic activity. This was verified by carrying out a number of experiments as a result of which the curves shown in Figure 3 were plotted. In these experiments 85 grams of a compounded latex at a temperature of 50° F. were mixed with 7 cc. of 130 vol. $H_2O_2$ and 2.5 cc. of 10% yeast dispersion. The mixture was incorporated into experimental molds and the rate of expansion observed. The yeast dispersion was prepared at temperatures of 40°, 60°, 80°, 100°, 120°, and 140° F. respectively. The results were plotted as shown in Figure 3 with time being plotted against volume until a volume of 1000 cc. was reached. The results clearly indicate that the yeast dispersion should be prepared at temperatures above 60° F. and preferably within the range of about 70° F. to 120° F. A temperature of 80° F. is usually satisfactory for most purposes. This temperature of dispersion gave a suitable induction period and the total time of foaming was in the desired range of about 1.5 to 2.5 minutes.

Figure 5:
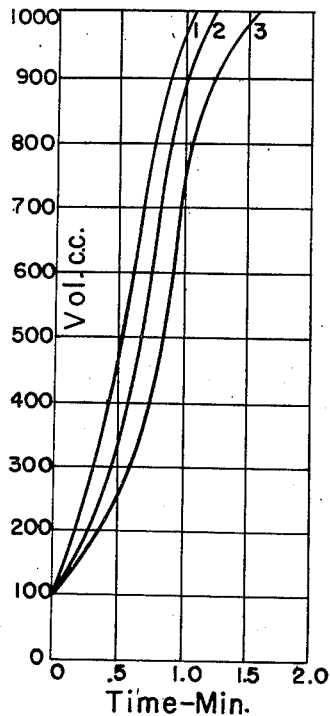
Figure 5 is a graph illustrating the effect of treatment with air upon the catalytic activity of yeast dispersions.

It was further found that the initial catalytic activity of yeast could be modified by preliminarily subjecting the yeast dispersion to a stream of air, oxygen, or $CO_2$. When yeast is utilized as a catalyst it is found that a portion of the oxygen liberated by the decomposition of the peroxide appears to be absorbed by the yeast. It was found that pretreatment of the yeast by passing a stream of air, oxygen, or $CO_2$ through the yeast dispersion accomplished two results: first, the adsorption of the gas on the surface of the yeast apparently delays the decomposition of the peroxide or retards the catalytic activity of the yeast; second, the preliminary treatment apparently saturated the yeast with the gas and permitted complete utilization of the peroxide in the formation of foam. In effecting modification by this method, a stream of gas was passed through the yeast dispersion for varying periods of time. The dispersion was then utilized as a catalyst in the manner described above. In the data plotted in the graph of Figure 5 a stream of air was passed through 100 cc. of 10% yeast dispersion for periods of three hours and twenty hours. The resulting dispersions were evaluated for a rate of expansion of foam by mixing 2.5 cc. of the air-treated yeast dispersions with 85 grams of compounded latex and 7 cc. of 130 vol. hydrogen peroxide and observing the rate of expansion of the foam. The results are shown in the curves of Figure 5. Curve No. 1 is a control run with non-aerated yeast; No. 2 is a curve illustrating the use of yeast which had been aerated for three hours; while curve No. 3 is a curve illustrating the use of yeast which has been aerated for twenty hours. The results clearly illustrate the retardation in the catalytic activity which is obtained by absorption of air by the yeast dispersion. Oxygen or $CO_2$ may also be used to inhibit the initial activity of the yeast in the manner as air.

Figure 6:
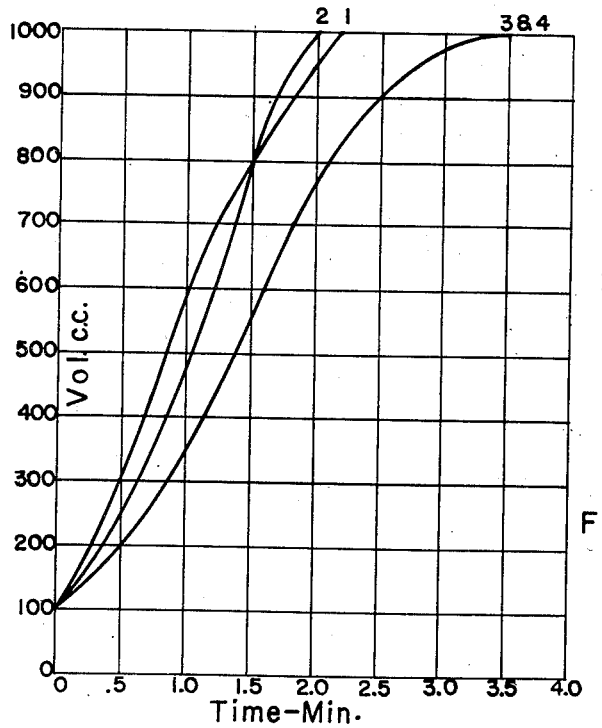
Figure 6 is a graph illustrating the effect of saponin in inhibiting the catalytic activity of yeast dispersion.

An additional method for inhibiting the initial activity of yeast as a catalyst for the decomposition of hydrogen peroxide was a discovery that the incorporation of minor proportions of saponin in the yeast dispersion was very effective for this purpose. The saponin was found to be effective in minor proportions preferably within the range of about 5% to 25% by weight of saponin based on the dry weight of yeast utilized. Saponin is preferably prepared as a dilute solution which is added to the yeast dispersion in the desired amounts. It is believed that the inhibiting action may be due to the absorption of the yeast or its catalase by the saponin. This theory is supported by the fact that it is preferable to allow the mixture to stand for a short period of time prior to use, otherwise the saponin is not too effective. This is clearly illustrated in Figure 6 in which the rate of expansion to a volume of 1000 cc. is plotted under different conditions. In the preparation of these curves the saponin solution prepared contained 15 grams of saponin and 85 grams of water. 3 cc. of this solution was added to 2½ cc. of 10% dispersion of yeast prepared at 80° F. This catalyst mixture is added to 85 grams of a compounded concentrated latex which is at a temperature of 50° F. together with 7 cc. of 130 vol. hydrogen peroxide.

Curve No. 1 is the result obtained without saponin.

Curve No. 2 is the result obtained using the saponin after permitting it to stand with the yeast for three minutes prior to incorporation into the latex mixture.

Curves Nos. 3 and 4, which are practically identical, illustrate the results obtained on allowing the yeast and saponin to stand for five and ten minutes respectively before use.

The time required to obtain a 300% increase in volume is increased from about .7 minute to about 1.2 minutes as shown by comparison between curves Nos. 1 and 3. Standing for periods longer than five minutes apparently does not increase the induction.

Figure 7:
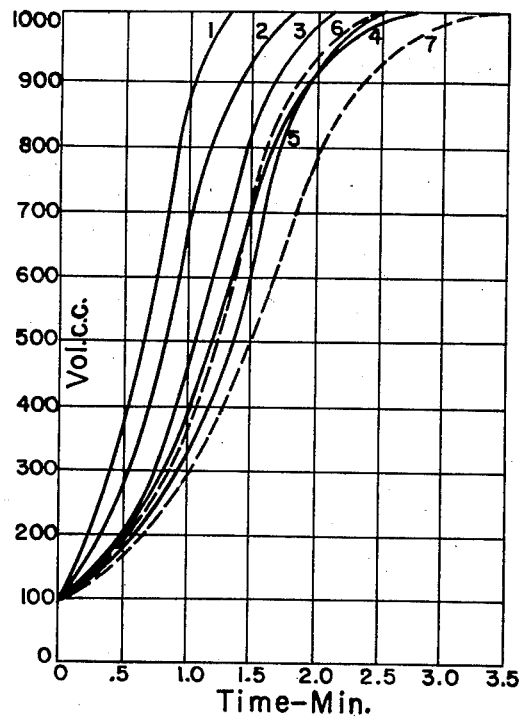
Figure 7 is a graph illustrating the effect of the addition of an alkali, such as KOH, to the latex compound, on the catalytic activity of catalase in the form of yeast.

It has also been discovered that the addition of alkaline materials to the latex compound will influence the rate of catalytic activity of the catalytic material. This is illustrated in Figure 7 in which the volume of foam is plotted against time required for the latex sample to expand to 1000 cc. using yeast. 85 grams of concentrated latex compound containing 7 cc. of 130 vol. hydrogen peroxide and 2.5 cc. of 10% yeast dispersion made at 70° F. were used in plotting the series of curves shown in the graph, with the alkali added in varying proportions. KOH was the alkali utilized. Curve No. 1 is the control curve and curves Nos. 2 to 6 inclusive represent the addition of .1, .2, .3, .4, and .5 gram of KOH to the latex compound. Curve No. 7 represents the same KOH concentration as curve No. 6 except that 3.5 cc. of yeast was added instead of 2.5 cc. These data clearly illustrate the retarding effect of the addition of the alkaline material. Instead of KOH any other alkaline materials, such as NaOH, may also be used.

Figure 4:
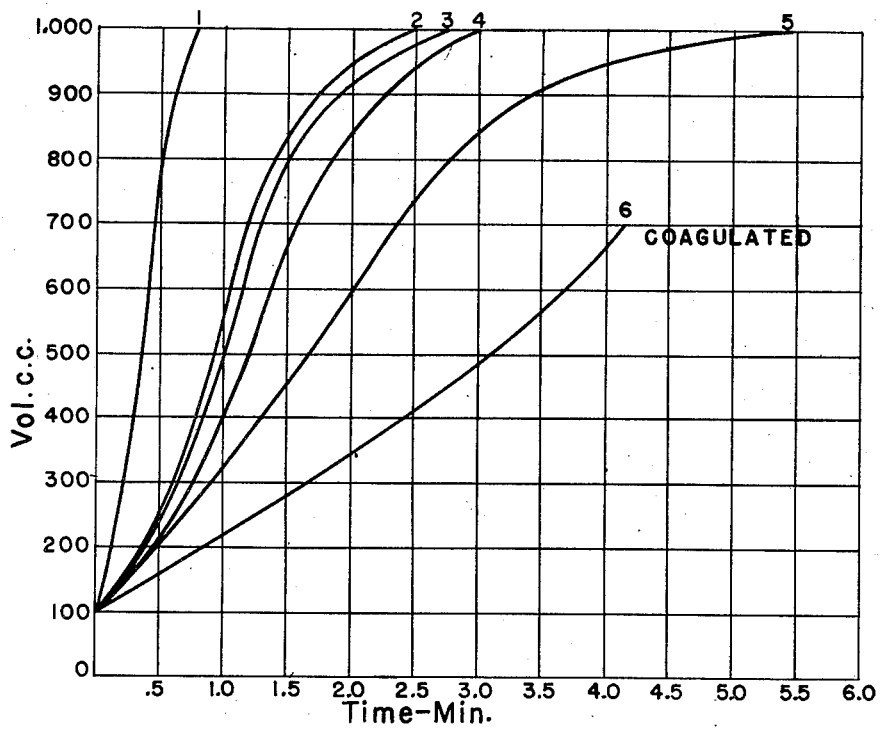
Figure 4 is a graph illustrating the effect of a chemical inhibitor, such as formaldehyde, upon the catalytic activity of catalase in the form of yeast.

The temporary poisoning of the catalyst with formaldehyde was found to be a highly effective method for delaying or inhibiting the initial catalytic activity. In Figure 4 a series of curves illustrating the effect of formaldehyde on yeast dispersions is shown. The volume of foam obtained using the sample of latex was plotted against time required to record a volume of 1000 cc. In obtaining these data 85 grams of concentrated latex compound was used with which was incorporated 2.5 cc. of 10% yeast dispersion made at 60° F. and 7 cc. of 130 vol. $H_2O_2$. The temperature of the latex was 50° F. The following amounts of formaldehyde were added to the yeast and then immediately added to the compound:

Curve No. 1, yeast without formaldehyde.
Curve No. 2, 0.10 cc. of a 9% solution of formaldehyde.
Curve No. 3, 0.15 cc. of a 9% solution of formaldehyde.
Curve No. 4, 0.20 cc. of a 9% solution of formaldehyde.
Curve No. 5, 0.20 cc. of a 17.5% solution of formaldehyde.
Curve No. 6, 0.25 cc. of a 35% solution of formaldehyde.

As the curves clearly show, incorporation of even small amounts of formaldehyde exerts a highly inhibiting effect upon the initial catalytic activity. The use of excessive amounts of formaldehyde either retards the catalytic activity excessively or effects coagulation of the foam before its complete development as shown in curve No. 6. In general, formaldehyde concentrations of less than .05 gram of formaldehyde per 100 grams of latex compound may be used. Concentrations in the range of .005 gram to .04 gram of formaldehyde per 100 grams of latex compound are preferred.

Figure 8:
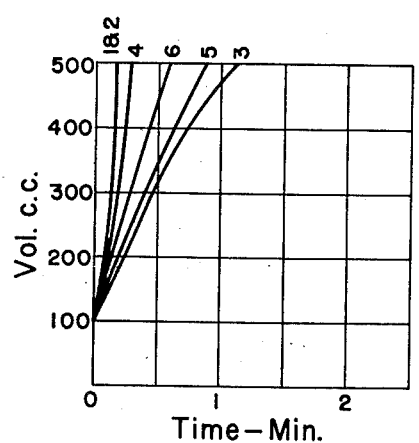
Figure 8 is a graph illustrating the inhibiting effects of adsorption of catalase upon a carrier, such as bone charcoal, compared with unadsorbed catalase and catalase with formaldehyde.

Applicant has further discovered that the catalytic activity of catalase and catalase containing materials, such as yeast, when used for the catalytic decomposition of peroxide materials in the foaming of rubber latex, may be retarded at least during the initial stage of the reaction, without reducing the proportion of the catalyst utilized, by associating the catalyst with a quantity of inert material preferably having a large surface area. This material must be such that it may be suitably incorporated as a component of the rubber mixture. The catalyst may be adsorbed upon the surface of finely divided bone charcoal or other forms of active carbon. In general, the catalyst is prepared by incorporating the catalase solution, or the yeast dispersion, or the like upon an inert material having a relatively large surface area, such as charcoal, silica gel, fuller's earth, bauxite, or other clay type carriers. These carriers are preferably of small particle size so that they may remain as fillers in the final product. Contrary to expectations, the distribution of the catalyst over a large surface area, instead of increasing the initial activity as might be anticipated, has been found to retard or inhibit this activity. The catalyst is prepared by incorporating the solution of catalase or dispersion of yeast upon an inert material. The results obtained by the use of inert carriers of the type described are illustrated in Figure 8. In the graph shown the catalyst preparation is added to 85 grams of concentrated latex compound containing 7 cc. of 130 vol. hydrogen peroxide to a temperature of 50° F. In the curves shown the time required for the latex to expand to a volume of 500 cc. is plotted. Curves Nos. 1 and 2 represent the results obtained using 3.5 cc. of 5% catalase solution without carrier as the catalyst. In curve No. 1 the catalase solution is used fresh, while in curve No. 2 it is allowed to stand for one hour. This shows that there is no substantial loss of activity in standing for certain periods of time. Curve No. 3 represents the result obtained by utilizing 5 grams of a dispersion containing 10 grams of bone charcoal and 90 grams of 5% catalase. Curve No. 4 illustrates the results obtained using 15 cc. of a solution made up of 16 grams of 9% formaldehyde and 84 grams of 5% catalase. These data indicate that bone charcoal as a carrier is a more effective inhibiting agent than formaldehyde.

Curve No. 5 illustrates the results obtained using 10 cc. of a suspension of bone charcoal and yeast made up of 200 grams of bone charcoal, 100 grams of a 40% dispersion of yeast in water, 100 grams of water, and a dispersing agent. Comparing this with the yeast alone without bone charcoal as in curve No. 6, a substantial increase in the induction period or decrease in catelytic activity of yeast by the use of the adsorbent is indicated.

In certain cases it has been found desirable to utilize finely divided adsorbent materials, such as active carbon alone, as the delayed action catalyst. It was discovered that such materials, for example bone charcoal or other charcoal, would function as catalysts for the decomposition of the peroxide but would have a fairly long induction period and give a relatively slow overall time of decomposition. The addition of other catalytic materials to the adsorbent as described above would serve to give suitably retarded initial catalytic activity by a satisfactory overall rate of peroxide decomposition.

In addition to formaldehyde as described above for the chemical inhibition of the activity of the catalyst, it was found that other chemical materials, such as sulfanilamide and toluene, would also function in this respect. Certain bactericides or fungicides have a similar activity, such as for instance sodium pentachlorophenol in concentrations of 0.25% or less on the dry yeast substance.

The various methods and means described above for effecting the delaying action of the catalyst may be used individually or collectively where desired. For example, it is frequently desirable to refrigerate the dispersion to a temperature of 30° F. to 60° F. prior to foaming and also to prepare the yeast catalyst at temperatures of 80° F. or higher to obtain a more retarded initial activity. The use of chemical inhibitors, alkaline materials, adsorbents, etc. as set forth herein, may also occur alone or in conjunction with one or more of the other expedients described where it is desired to obtain a greater retardation of catalytic activity than can desirably be obtained by the use of only one of the inhibiting means in question.

A typical natural latex compound as used in obtaining the data illustrated in the various graphs referred to above, is as follows:

|   | Parts |
|---|---|
| Natural latex (concentrated to 68% solids) | 100. |
| Emulsifying agent | 0.5 |
| Casein | 1.5 |
| Zinc oxide | 5.0 |
| Antioxidant | 2.0 |
| Sulfur | 2.5 |
| Accelerator | 1.5 |

The foregoing data may be applied to other conventional compounded latices containing fillers, pigments, and other known modifying materials.

While the invention has been described above in connection with natural rubber latices, the principles thereof are equally applicable to the foaming of other aqueous dispersions of rubber. The term "rubber" as used herein includes not only natural rubber, but also the synthetic rubber-like materials which are formed or may be dispersed in aqueous suspension. These include the conjugated diolefine polymers and copolymers with monomers copolymerizable therewith having a reactive ethylenic double bond, as well as the polyhaloprenes and other elastomers. Artificial rubber dispersions may also be used. Mixtures of the various types of rubber in dispersion form may also be utilized. The synthetic rubber-like materials which may be foamed in the manner described herein in addition to dispersions of natural rubber, include the butadiene-acrylic nitrile copolymers commonly known as Buna-N, GR-A, and the like, the butadiene-styrene copolymers commonly known as GR-S or Buna-S, the polychloroprene polymers commonly known as neoprene, and other elastomers of which aqueous dispersions may be formed.

Catalase is generally the preferred catalyst for use in the process and yeast is the preferred source and form in which the catalase is utilized. Other sources of catalase may be used as well as other materials which catalyze the decomposition reaction. In general, aqueous solutions of hydrogen peroxide are preferred as the source of oxygen to cause foaming but other per-compounds which are compatible with the rubber dispersion may be used satisfactorily. These include the inorganic peroxides and per-salts, such as sodium or potassium peroxides, the alkali metal per-borates, and the like.

I claim:

1. The method for the manufacture of cellular rubber which comprises incorporating in an aqueous dispersion of rubber an unstable peroxide capable of liberating free oxygen on decomposition together with a minor proportion of yeast as a catalyst for such decomposition, said yeast having been prepared by dispersion in water at a temperature in the range of 70° F. to 120° F., permitting the decomposition of the oxygen compound to occur with resultant foaming of the rubber dispersion, coagulating the foamed rubber and vulcanizing the coagulated product.

2. The method for the manufacture of cellular rubber which comprises incorporating in an aqueous dispersion of rubber an unstable peroxide capable of liberating free oxygen on decomposition together with a minor proportion of yeast as a catalyst for such decomposition, the initial catalytic activity of said yeast having been modified by dispersion in water and by intimately contacting said dispersion with a stream of a gas selected from the class consisting of air, oxygen, and carbon dioxide, permitting the decomposition of the oxygen compound to occur with resultant foaming of the rubber dispersion, coagulating the foamed rubber and vulcanizing the coagulated product.

3. In the production of a sponge rubber article by inducing foam in a rubber latex by decomposition of a peroxide, the improvement which comprises the introduction into the latex of baker's yeast in sufficient amount to decompose the peroxide.

4. In the foaming of aqueous rubber dispersions by the decomposition of unstable peroxides incorporated therein to liberate free oxygen in the presence of a material which catalyzes the decomposition, the method which comprises retarding the rate of decomposition of the peroxide and of foaming of the dispersion during the initial period following contact of the peroxide with the catalyst within the dispersion which comprises introducing yeast as the catalyst for the decomposition while avoiding coagulation of the dispersion, said yeast having an inhibited and delayed initial catalytic activity.

5. The method according to claim 4 wherein the yeast is prepared in the form of an aqueous dispersion at a temperature above room temperature and cooled to room temperature or below prior to incorporation in the rubber dispersion.

6. The method according to claim 4 in which the initial activity of the yeast is modified by dispersing the yeast in water and passing a stream of a free oxygen containing gas therethrough prior to the incorporation of the yeast in the rubber dispersion.

7. The method according to claim 4 wherein the initial activity of the yeast is modified by the incorporation of a minor proportion of saponin.

8. The method according to claim 4 wherein the activity of the yeast is modified by increasing the alkalinity of the rubber dispersion to which the yeast is added to a pH within the range of 10 to 12 by the addition of an alkali metal hydroxide.

9. The method according to claim 4 wherein the initial activity of the catalyst is modified by the incorporation of a minor proportion of formaldehyde in an amount insufficient to effect coagulation of the foam before its expansion to the desired volume.

10. The method according to claim 3 wherein the catalyst is hydrogen peroxide and wherein the yeast is incorporated in the dispersion in the proportion of 0.075 to 0.3 gram of yeast for each gram of hydrogen peroxide.

11. The method for the manufacture of molded cellular rubber which comprises incorporating in an aqueous suspension of rubber an unstable peroxide capable of liberating free oxygen on decomposition together with a catalyst for such decomposition comprising yeast, retarding the initial activity of the catalyst, introducing the resulting composition into a mold before substantial decomposition of the peroxide and foaming of the dispersion occurs, and permitting substantial decomposition of the peroxide to occur within the mold accompanied by foaming and expansion of the rubber dispersion, coagulating the resulting foam within the mold, vulcanizing the coagulated material, and removing the vulcanized product from the mold.

12. In a method of forming foamed rubber products from aqueous dispersions of rubber wherein free oxygen is liberated from an unstable peroxide in the dispersion decomposable in the presence of a catalyst comprising yeast to liberate free oxygen and to generate foam, and wherein the resulting foam is shaped, coagulated and vulcanized, the improvement which comprises refrigerating the dispersion to a temperature in the range of about 30° F. to 60° F. prior to the incorporation of said catalyst to inhibit the initial activity thereof and retard said decomposition during the initial stages of the reaction.

13. The method according to claim 12 wherein the aqueous dispersion of rubber comprises a synthetic rubber-like material formed by the copolymerization of a conjugated diolefin with a monomer copolymerizable therewith and having a reactive ethylenic double bond.

References Cited in the file of this patent

UNITED STATES PATENTS

| | | |
|---|---|---|
| 1,980,813 | Madge | Nov. 13, 1934 |
| 2,138,081 | Wolf | Nov. 29, 1938 |
| 2,217,605 | Carter | Oct. 8, 1940 |
| 2,432,353 | Talalay | Dec. 9, 1947 |
| 2,540,040 | Baker | Jan. 30, 1951 |

FOREIGN PATENTS

| | | |
|---|---|---|
| 402,067 | Great Britain | Apr. 25, 1933 |
| 420,912 | Great Britain | Dec. 6, 1934 |

OTHER REFERENCES

Waksman and Davison's "Enzymes," Baltimore, 1926, pages 53 to 58.